US008838077B2

(12) United States Patent
Felt et al.

(10) Patent No.: US 8,838,077 B2
(45) Date of Patent: Sep. 16, 2014

(54) MOBILE SERVICES ACCESS MANAGEMENT METHODS AND SYSTEMS

(75) Inventors: Michelle Felt, Randolph, NJ (US); Farida Saeed, Boonton, NJ (US); Donald H. Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 580 days.

(21) Appl. No.: 12/874,893

(22) Filed: Sep. 2, 2010

(65) Prior Publication Data
US 2012/0058744 A1 Mar. 8, 2012

(51) Int. Cl.
*H04M 3/42* (2006.01)
*H04M 3/38* (2006.01)
*H04W 12/08* (2009.01)
*H04W 12/06* (2009.01)
*H04W 52/02* (2009.01)
*H04L 29/08* (2006.01)

(52) U.S. Cl.
CPC .............. *H04M 3/382* (2013.01); *H04W 12/08* (2013.01); *H04W 12/06* (2013.01); *H04W 52/0258* (2013.01); *H04L 67/306* (2013.01); *H04M 2203/2072* (2013.01); *H04M 2242/28* (2013.01)
USPC ...................... 455/414.1; 455/411; 455/412.1; 455/412.2; 455/414.2; 455/414.3; 455/415; 455/418

(58) Field of Classification Search
CPC ... H04W 52/0258; H04W 12/06; H04W 4/02; H04W 12/08; H04L 67/306; H04L 12/5895; H04L 51/18; H04L 63/083
USPC ............... 455/414.1, 26.1, 411, 412.1, 412.2, 455/414.2, 414.3, 415, 418
See application file for complete search history.

(56) References Cited

U.S. PATENT DOCUMENTS

| 7,233,229 B2* | 6/2007 | Stroupe et al. ............. 340/309.7 |
| 8,467,770 B1* | 6/2013 | Ben Ayed ..................... 455/411 |
| 2008/0005325 A1* | 1/2008 | Wynn et al. ................... 709/225 |
| 2008/0045186 A1* | 2/2008 | Black et al. ................... 455/413 |

* cited by examiner

*Primary Examiner* — Olumide T Ajibade Akonai

(57) ABSTRACT

An exemplary method includes a mobile services access management system maintaining a mobile services access schedule associated with a mobile access device, the mobile services access schedule specifying one or more restricted access time periods during which access by the mobile access device to one or more mobile services requires entry of a predetermined access code, receiving a request to access at least one mobile service within the one or more mobile services during one of the one or more restricted access time periods, receiving entry of a predetermined access code in conjunction with the request, granting the mobile access device access to the at least one mobile service, and providing a notification of the access to a predetermined recipient. Corresponding methods and systems are also disclosed.

24 Claims, 9 Drawing Sheets

MOBILE SERVICES ACCESS MANAGER

Account   Log Out

HOME > LINK TO A CALENDAR 602-1 — Available Calendars
[Golden Hills Middle School, Golden Hills, GC ▽]

602-2 — Excluded Time Period(s)
From        602-3 — To
[11:45am ▽]    [12:30pm]

+ Add Excluded Time Period 602-4 — Exclude State and Federal Holidays?
Yes ☑   No ☐

602-5 — Access Code
[567#]

602-6 — Notification Recipient(s)/Method(s)
[555-444-2222]        [Text Message ▽]
[principal@goldenhills.com]   [Email ▽]

+ Add Recipient

[Add] — 604
[Cancel] — 606

600

Mobile Phone Use Notification

The mobile phone associated with mobile phone number 555-444-3333 sent a text message to 555-444-5555 on 9/25 at 11:00am containing the following message:

I am having so much fun in Spanish class! Do you want to study tonight?

MOBILE SERVICES ACCESS MANAGEMENT METHODS AND SYSTEMS

BACKGROUND INFORMATION

Advances in mobile communications technologies have interconnected people and allowed for distribution of information perhaps better than ever. To illustrate, the increased capabilities of mobile access devices, such as mobile phones, laptop computers, and handheld devices, and corresponding mobile services have allowed users to communicate, send and receive data, and access media content (e.g., video, audio, photographs, and/or multimedia) like never before.

While the increased capabilities and usage of mobile access devices and/or corresponding mobile services may be beneficial in one or more ways, they may also have one or more negative effects. For example, the distractions of mobile access devices and/or corresponding mobile services may become a detriment to educational, corporate, and/or other endeavors. To illustrate, the quality of an educational experience provided by schools and other educational institutions may be negatively affected by excessive use of mobile access devices by students. Similarly, an organization (e.g., a business) may experience reduced productivity and efficiency due to the use of mobile access devices by its employees during working hours.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers may designate identical or similar elements.

FIG. 4 illustrates an exemplary graphical user interface ("GUI") within which an exemplary mobile services access schedule may be displayed according to principles described herein.

FIG. 6 illustrates an exemplary GUI configured to facilitate the linking of the mobile services access schedule of FIG. 4 to a calendar according to principles described herein.

FIG. 7 illustrates an exemplary notification that may be provided according to principles described herein.

DETAILED DESCRIPTION OF PREFERRED EMBODIMENTS

Figure 1:
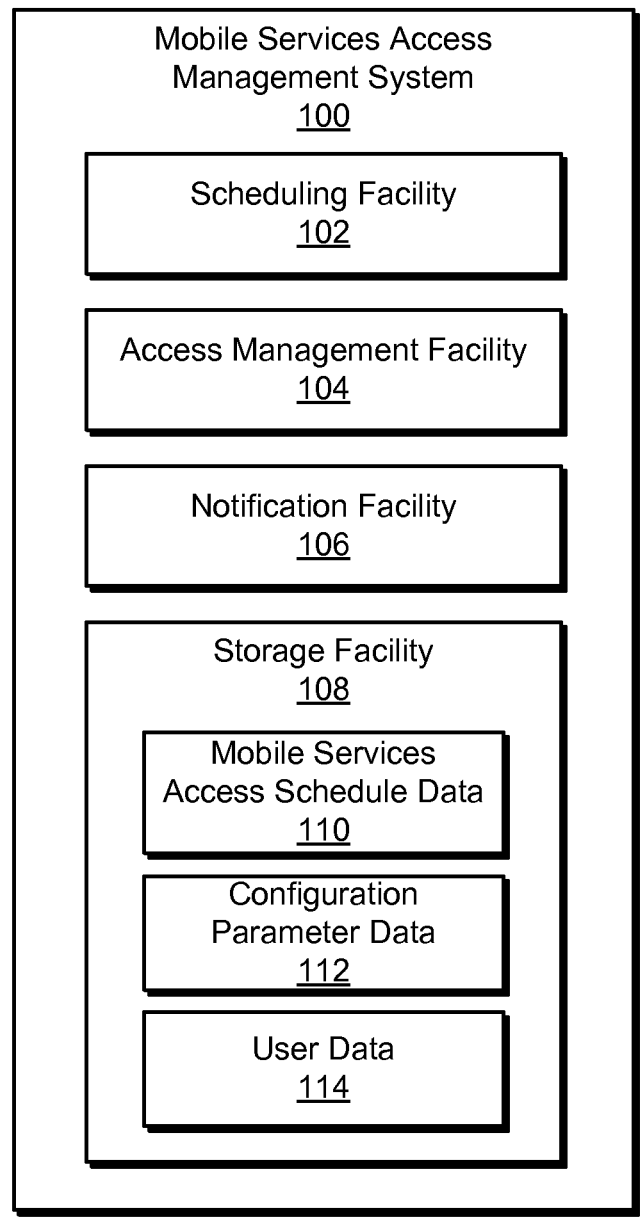
FIG. 1 illustrates an exemplary mobile services access management system according to principles described herein.

Exemplary mobile services access management methods and systems are disclosed herein. As described in more detail below, a mobile services access management system may maintain a mobile services access schedule associated with a mobile access device. The mobile services access schedule may specify one or more restricted access time periods and one or more normal access time periods. Access by the mobile access device to one or more mobiles services (e.g., a mobile telephone service, a mobile text message service, a mobile email service, a mobile data service, etc.) during the one or more restricted access time periods requires entry of a predetermined access code while access by the mobile access device to the one or more mobile services during the one or more normal access time periods does not require entry of the predetermined access code. The mobile services access management system may receive, during one of the one or more restricted access time periods, a request to access at least one mobile service within the one or more mobile services, receive an entry of the predetermined access code in conjunction with the request, and grant the mobile access device access to the at least one mobile service in response to receiving the entry of the predetermined access code. The mobile services access management system may provide a notification of the access by the media content access device to the at least one mobile service to a predetermined recipient.

As used herein, the term "mobile access device" refers to any access device capable of accessing one or more mobile services. For example, a mobile access device may be capable of, but not limited to, accessing a mobile telephone service, a mobile email service, a mobile text message service, a mobile data service, and/or any other suitable mobile service. Mobile access devices may include, but are not limited to, a mobile phone device, a laptop computer, a tablet computer, a handheld device, a personal digital assistant device, a gaming device, and/or any other suitable device configured to access one or more mobile services.

As used herein, the term "mobile service" refers to any service that may be accessed by a mobile access device. For example, mobile services may include one or more telephone calling services, text messaging services, instant messaging services, email services, data services, video services, video call services, search engines, audio services, gaming services, and/or any other suitable service that may be accessed by a mobile access device.

As used herein, the term "accessing a mobile service" refers to accessing or utilizing a mobile service in any suitable manner. For example, accessing a telephone calling service may include initiating an outgoing telephone call or receiving an incoming telephone call, accessing a mobile text messaging service may include sending or receiving a text message, accessing an email service may include sending or receiving an email, accessing a data service may include using the data service to send or receive data (e.g., to download one or more data files), and/or accessing any other mobile service may include utilizing the mobile service in any suitable manner.

The methods and systems described herein may provide enhanced capabilities for managing, controlling, and/or tracking usage of one or more mobile services. For example, the methods and systems described herein may allow a primary account holder of a mobile services account to manage the mobile services access of one or more mobile access devices associated with the mobile services account. To illustrate, the methods and systems described herein may allow a parent or employer to selectively manage access to mobile services by a mobile access device used by a child or employee. In addition, the methods and systems described herein may provide a primary account holder with up-to-date information regarding access to mobile services by mobile access devices associated with the mobile services account.

As used herein, the term "primary account holder" refers to any person or organization having authority over, control of, and/or responsibility for a user of a mobile access device and/or a mobile services account associated with the mobile access device. For example, a primary account holder may include a parent or guardian of a child, an employer or supervisor of an employee, a principal or teacher of a student, and/or any other suitable person having authority over, control of, and/or responsibility for a user of a mobile access device and/or a mobile services account associated with the mobile access device.

FIG. 1 illustrates an exemplary mobile services access management system 100 (or simply "system 100"). As will be described in more detail below, system 100 may be configured to manage access by a mobile access device to one or more mobile services.

System 100 may include, but is not limited to, a scheduling facility 102, an access management facility 104, a notification facility 106, and a storage facility 108, which may be in communication with one another using any suitable communication technologies. It will be recognized that although facilities 102-108 are shown to be separate facilities in FIG. 1, any of facilities 102-108 may be combined into fewer facilities, such as into a single facility, or divided into more facilities as may serve a particular implementation.

Scheduling facility 102 may be configured to maintain a mobile services access schedule associated with a mobile access device. In some examples, the mobile services access schedule may govern access by the mobile access device to one or more mobile services. For example, the mobile services access schedule may specify one or more restricted access time periods and one or more normal access time periods. In some examples, access by the mobile access device to the one or more mobile services during the one or more restricted access time periods requires entry of a predetermined access code while access by the mobile access device to the one or more mobile services during the one or more normal access time periods does not require entry of the predetermined access code. Scheduling facility 102 may be configured to maintain and/or manage the mobile services access schedule in any suitable manner.

In some examples, scheduling facility 102 may be configured to receive configuration parameters defining one or more aspects of the mobile services access schedule. The configuration parameters may be received by scheduling facility 102 in any suitable manner. For example, scheduling facility 102 may be configured to generate a graphical user interface ("GUI") by way of which one or more configuration parameters may be provided, as will be explained in more detail below. In some examples, the GUI may be provided by way of a web-based portal accessible by multiple users at different locations. For example, a user may log in to a website to access the GUI and provide the configuration parameters. The configuration parameters may be provided by a user having responsibility for and/or authority to control a mobile services account associated with the mobile access device. For example, the configuration parameters may be provided by a primary account holder (e.g., a parent or employer) of the mobile services account associated with the mobile access device.

By providing the configuration parameters, the primary account holder may selectively restrict access by the mobile access device to the one or more mobile services during the one or more restricted access time periods. To illustrate, a parent may provide configuration parameters to selectively restrict access by a child to one or more mobile services during one or more time periods associated with the child's school schedule, study schedule, work schedule, and/or sleep schedule. Accordingly, the parent may manage, monitor, and/or restrict access by the child to the one or more mobile services during time periods when the child should be studying, working, sleeping, etc.

The configuration parameters may define any suitable aspects and/or components of a mobile services access schedule. For example, the configuration parameters may define the dates and/or times of the one or more restricted access time periods, the dates and/or times of the one or more normal access time periods, the one or more mobile services that are to be restricted during the one or more restricted access time periods, and/or any other aspects associated with the mobile services access schedule, as will be explained in more detail below.

In some examples, the mobile services access schedule may be linked to a separate calendar. For example, scheduling facility 102 may be configured to communicate with (e.g., import data from) a calendaring system (e.g., a computing device implementing calendaring software) and dynamically update the mobile services access schedule in accordance with a calendar (e.g., a Microsoft Outlook calendar, a Google calendar, etc.) maintained by the calendaring system. The separate calendar and/or calendaring system may be maintained by a user (e.g., the user of the mobile access device or the primary account holder) or by a third party (e.g., an educational institution, a government agency, a corporation, etc.)

To illustrate, the mobile services access schedule may be linked to a calendar associated with a user's school schedule (e.g., a calendar maintained by a child's school and/or available by way of the school's website). Scheduling facility 102 may be configured to dynamically update the mobile services access schedule in accordance with the calendar. For example, in accordance with entries in or changes to the calendar, scheduling facility 102 may be configured to add one or more restricted access time periods to the mobile services access schedule (e.g., for time periods during which the user should be in school), delete one or more restricted access time periods from the mobile services access schedule (e.g., in response to a cancelation of one or more days of school), and/or modify one or more restricted access time periods of the mobile services access schedule (e.g., in response to changes to the school schedule).

Access management facility 104 may be configured to provide access-code-based access to one or more mobile services during a restricted access time period of a mobile services access schedule. In certain implementations, access management facility 104 may provide access-code-based access to at least one mobile service by blocking normal access to the at least one mobile service during the restricted access time period (e.g., by blocking access at a service level) and selectively providing access to the at least one mobile service during the restricted access time period only when a predetermined access code is received in conjunction with a request to access the at least one mobile service, such as by overriding the block when the predetermined access code is received in conjunction with the request to access the at least one mobile service. For example, access management facility 104 may be configured to receive a request to access at least one mobile service during a restricted access time period, receive an entry of a predetermined access code in conjunction with the request, and grant the mobile access device access to the at least one mobile service in response to the entry of the predetermined access code.

Access management facility 104 may be configured to receive the request to access the at least one mobile service in any suitable manner. For example, access management facility 104 may be configured to detect an attempt by the mobile access device to access the at least one mobile service. In some examples, the request may include an attempt by the user to make a phone call (e.g., an entry of a telephone number and/or an input command by the user to initiate a phone call), an attempt to send a text message (e.g., a composing of a text message and/or an input command to send a text message), an attempt to send an email (e.g., a composing of an email and/or an input command to send the email), an attempt to utilize a data service (e.g., an opening of an Internet browser, an opening of a data streaming application, and/or any other suitable attempt to use a data service), or any other attempt to use any other suitable mobile service. Additionally or alternatively, the request may be associated with an incoming communication. For example, access management facility 104 may be configured to detect an incoming telephone call, an incoming text message, and/or an incoming email. Access management facility 104 may be configured to receive the request in any other suitable manner.

Access management facility 104 may be configured to receive the entry of a predetermined access code in any suitable manner. In some examples, access management facility 104 may be configured to detect that the predetermined access code is included in a communication. For example, access management facility 104 may be configured to detect that a user entered the predetermined access code within a header field or the body of a text message, an email, and/or any other suitable communication. Additionally or alternatively, access management facility 104 may be configured to detect the entry of a predetermined access code with a telephone number or email address associated with a communication. For example, access management facility 104 may be configured to detect that a user entered the predetermined access code along with a telephone number (e.g., as a prefix code preceding the telephone number) to which the user wishes to make a telephone call or send a text message, or along with an email address to which the user wishes to send an email. In additional or alternative examples, access management facility 104 may be configured to prompt a user for and receive the user's entry of a predetermined access code. For example, access management facility 104 may be configured to prompt a user for entry of the predetermined access code in response to a request to access the at least one mobile service. Access management facility 104 may be configured to receive the entry of the predetermined access code in any other suitable manner as may serve a particular implementation.

Access management facility 104 may be configured to grant the mobile access device access to the at least one mobile service in any suitable manner. For example, in response to receiving the entry of the predetermined access code, access management facility 104 may be configured to allow the mobile access device to access the at least one mobile service in accordance with the request, such as by overriding a service access block that is active during a restricted access time period.

In some examples, access management facility 104 may be configured to limit the access-code-based access by the mobile access device to the at least one mobile service to a single use. For example, access management facility 104 may be configured to limit the access-code-based access to a single telephone call, a single email, and/or a single text message. Accordingly, another access to the at least one mobile service may require another entry of the predetermined access code. Access management facility 104 may be configured to further limit access-code-based access to the at least one mobile service in any other suitable manner. For example, access management facility 104 may be configured to limit a duration of the access, a length of a communication sent or received during the access, and/or any other suitable aspect of the access.

In additional or alternative examples, access management facility 104 may be further configured to require that the mobile access device be physically located within a predetermined geographic area in order to grant the mobile access device access to the at least one mobile service. To illustrate, access management facility 104 may be configured to detect a physical location of the media content access device, determine that the physical location of the media content access device is within a predetermined geographic area, and, in response to the determination, grant the mobile access device access to the at least one mobile service. The predetermined geographic area may include a geographic area associated with the user of the mobile access device. For example, the predetermined geographic area may include a geographic area associated with the user's school, workplace, home, etc. Accordingly, a restricted access time period of the mobile services access schedule may be configured to require that the user's mobile access device be located within the predetermined geographic area in order to gain access to the at least one mobile service.

In some examples, access management facility 104 may be configured to override a restricted access time period in response to receiving an override command. For example, in response to receiving an override command (e.g., from a parent or employer), access management facility 104 may be configured to override the requirement to enter the predetermined access code during a particular restricted access time period such that the mobile access device is granted unrestricted access to the one or more mobile services during the particular restricted access time period.

Access management facility 104 may be configured to receive the override command in any suitable manner. In some examples, access management facility 104 may be configured to receive the override command by way of a GUI generated and/or displayed by access management facility 104. In some examples, the GUI may be provided by way of a web-based portal. For example, a primary account holder may log in to a corresponding website and use the GUI to provide the override command (e.g., a parent may select a box or other option within the GUI to override a particular restricted access time period). In additional or alternative examples, receiving the override command may include receiving a communication that includes a predetermined override code (e.g., the predetermined override code may be entered into a header field or into the body of the communication) during a particular restricted access time period to be overridden. For example, a primary account holder (e.g., a parent) may enter the predetermined override code into a text message and send the text message to a user's (e.g., a child's) mobile access device during a particular restricted access time period to override the particular access time period. In some examples, access management facility 104 may be configured to conceal the override code within the communication and/or conceal the entire communication from the user of the mobile access device. Accordingly, the user may be prevented from obtaining and later using the override code.

Access management facility 104 may be configured to store and/or delay the delivery of communications sent to a mobile access device during a restricted access time period. For example, access management facility 104 may be configured to store and/or delay the delivery of one or more text messages sent to the mobile access device during the restricted access time period, one or more voicemail messages created for a user of the mobile access device during the restricted access, one or more emails sent to the mobile access device during the restricted access time period, and/or any other suitable communications sent to the mobile access device during the restricted access time period. Thereafter, access management facility 104 may provide the user of the mobile access device with access to the stored and/or delayed communications at the end of the restricted access time period.

In some examples, access management facility 104 may selectively allow communications between a user of a mobile access device and one or more other users during a restricted access time period. For example, during a restricted access time period in which a child's mobile access device is blocked from outgoing and incoming communications, access management facility 104 may be configured to selectively allow communications sent to or received from one or more predetermined users (e.g., a parent, another family member, a guardian, an emergency contact, etc.) and/or devices (e.g., a parent's mobile phone, a parent's computing device, a home phone, an emergency response system, etc.). As a result, the child may be allowed to communicate with a select number of predetermined users (e.g., in an emergency situation), despite being restricted with respect to general communications. Access management facility 104 may be configured to selectively allow communications during a restricted access time period in any suitable manner and with any suitable number of predetermined users and/or devices.

In additional or alternative examples, access management facility 104 may be configured to receive the override command and/or override the corresponding restricted access time period in any other suitable manner as may serve a particular implementation.

Notification facility 106 may be configured to provide a notification of the access by the mobile access device to the at least one mobile service to a predetermined recipient. In some examples, the notification may be provided in response to access-code-based access granted by access management facility 104 and/or triggered by the predetermined access code. For example, access management facility 104 may provide access information to notification facility 106 each time that access-code-based access to a mobile service is granted, and notification facility 106 may utilize the access information to generate and provide a notification descriptive of the access to the mobile service to the predetermined recipient. In certain examples, a predetermined access code may be associated with one or more predetermined recipients such that when the predetermined access code is used to gain access to a mobile service, access management facility 104 may identify the predetermined access code, identify from the predetermined access code the associated one or more predetermined recipients, and notify the one or more predetermined recipients of the access. In certain implementations, multiple predetermined access codes may be defined for use to grant access-code-based access to a mobile service and to notify specific sets of one more predetermined recipients of the access.

Notification facility 106 may be configured to provide the notification to the predetermined recipient in any suitable manner. In some examples, notification facility 106 may include the notification in a communication sent to the predetermined recipient (e.g., sent to a mobile access device and/or another computing device associated with the predetermined recipient). For example, notification facility 106 may be configured to send the notification to the predetermined recipient by way of a text message, a voice message, an email, and/or any other suitable communication. Additionally or alternatively, the notification may include posting information descriptive of usage of one or more mobile services during a restricted access time period such that the information becomes accessible to the predetermined recipient. For example, notification facility 106 may post such information to a web site that is accessible by the predetermined recipient.

The notification may include any suitable information as may serve a particular implementation. For example, the notification may include information identifying the mobile access device granted access to the mobile service, a time of the access, a duration of the access, a content of a communication sent or received during the access, a sender or recipient of a communication sent or received during the access, a physical location of the mobile access device at the time of the access, and/or any other suitable information associated with the mobile access device and/or the access. Information included in the notification may allow the recipient of the notification to analyze usage of one or more mobile services during a restricted time period. For example, a parent may analyze a child's usage of one or more mobile services during school hours to see how the child's usage of the one or more mobile services may be affecting the child's school experience.

The predetermined recipient may be any suitable recipient or combination of recipients. For example, the predetermined recipient may include a primary account holder of the mobile services account associated with the media content access device, an employment or educational supervisor of the user of the media content access device, a parent or caretaker of the user of the media content access device, and/or any other suitable recipient(s).

Storage facility 108 may be configured to maintain mobile services access schedule data 110 representative of one or more mobile services access schedules, configuration parameter data 112 representative of one or more configurations parameters, and user data 114 representative of and/or otherwise associated with one or more users (e.g., a user of a mobile access device, a primary account holder of the mobile services account associated with the mobile access device, etc.). Storage facility 108 may be configured to maintain additional or alternative data as may serve a particular implementation.

Figure 2:
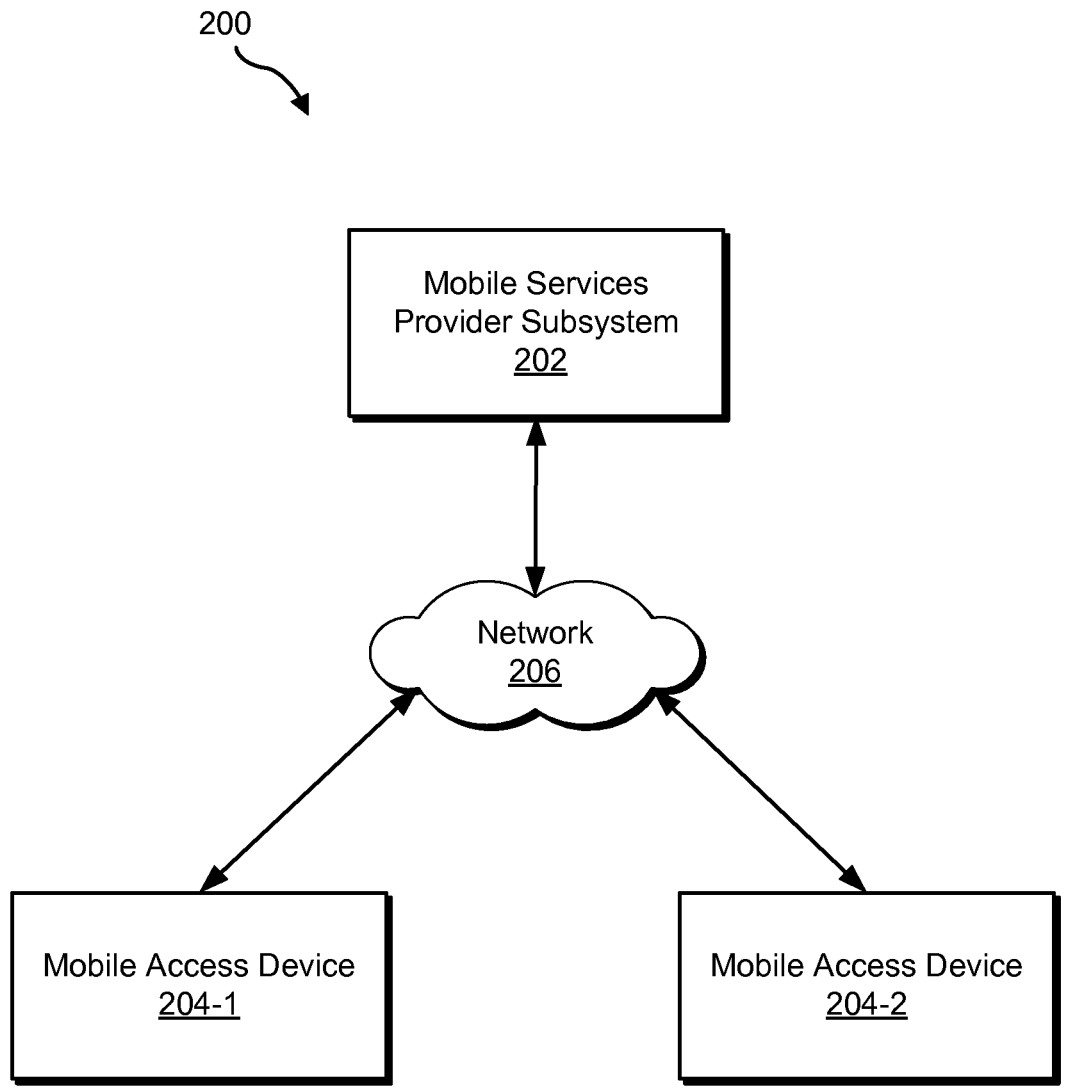
FIG. 2 illustrates an exemplary implementation of the system of FIG. 1 according to principles described herein.

FIG. 2 illustrates an exemplary implementation 200 of system 100 wherein a mobile services provider subsystem 202 (or simply "provider subsystem 202") is communicatively coupled to mobile access devices 204-1 and 204-2 (collectively referred to herein as "mobile access devices 204"). As will be described in more detail below, scheduling facility 102, access management facility 104, notification facility 106, and storage facility 108 may each be implemented on one or more of provider subsystem 202 and mobile access devices 204.

Mobile access devices 204 and provider subsystem 202 may communicate using any suitable communication technologies, devices, networks, network platforms, media, and protocols supportive of remote data communications. For example, as shown in FIG. 2, provider subsystem 202 may be configured to communicate with mobile access devices 204 over a network 206 (and communications links thereto). Network 206 may include one or more networks or types of networks capable of carrying communications and/or data signals between provider subsystem 202 and mobile access devices 204. For example, network 206 may include, but is not limited to, a wireless network (e.g., a Wi-Fi and/or mobile telephone network), a satellite network, the Internet, an intranet, a local area network, any other suitable network, and/or any combination or sub-combination of these networks.

Provider subsystem 202 and mobile access devices 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, in-band and out-of-band signaling technologies, and any other suitable communications technologies, devices, media, and protocols.

While FIG. 2 shows provider subsystem 202 and mobile access devices 204 communicatively coupled via network 206, it will be recognized that provider subsystem 202 and mobile access devices 204 may be configured to communicate one with another in any other suitable manner (e.g., via a direct connection). Moreover, it will be recognized that in some examples, system 100 may be implemented entirely by provider subsystem 202, by one or both of mobile access devices 204, or by a combination of provider subsystem 202 and one or both of mobile access devices 204.

In some examples, provider subsystem 202 may be configured to provide one or more mobile services. Mobile access devices 204 may be configured to facilitate access to the mobile services provided by provider subsystem 202. For example, mobile access devices 204 may allow a user to make and receive telephone calls, send and receive text messages, send and receive email, download and upload data files (e.g., media content files), etc. by way of provider subsystem 202.

In some examples, mobile access device 204-1 may be associated with a first user (e.g., a child, a student, an employee, etc.) and mobile access device 204-2 may be associated with a second user, such as a primary account holder (e.g., a parent, an administrator, an employer, etc.). The primary account holder may utilize mobile access device 204-2 and/or another computing device to selectively manage access by mobile access device 204-1 to one or more mobile services provided by provider subsystem 202. For example, in certain embodiments, the primary account holder may utilize mobile access device 204-2 and/or another computing device to create, modify, and/or manage a mobile services access schedule for mobile access device 204-1, receive notifications regarding access by mobile access device 204-1 to at least one mobile service during a restricted access time period, and/or perform any other suitable operation such as described herein. Although the foregoing example includes a single "restricted" mobile access device 204-1 and a single "account holder" mobile access device 204-2, further examples may include any suitable number of "restricted" mobile access devices associated with any suitable number of users (e.g., children, students, employees, etc.) and any suitable number of "account holder" mobile access devices associated with any suitable number of primary account holders (e.g., parents, administrators, employers, supervisors, etc.). Mobile access devices 204 may each be implemented as may suit a particular implementation. For example, mobile access devices 204 may each include a mobile phone device, a personal computer (e.g., a laptop computer, a tablet computer, etc.), a handheld device, a personal-digital assistant device, a gaming device, and/or any device configured to perform one or more of the processes and/or operations described herein.

Figure 3:
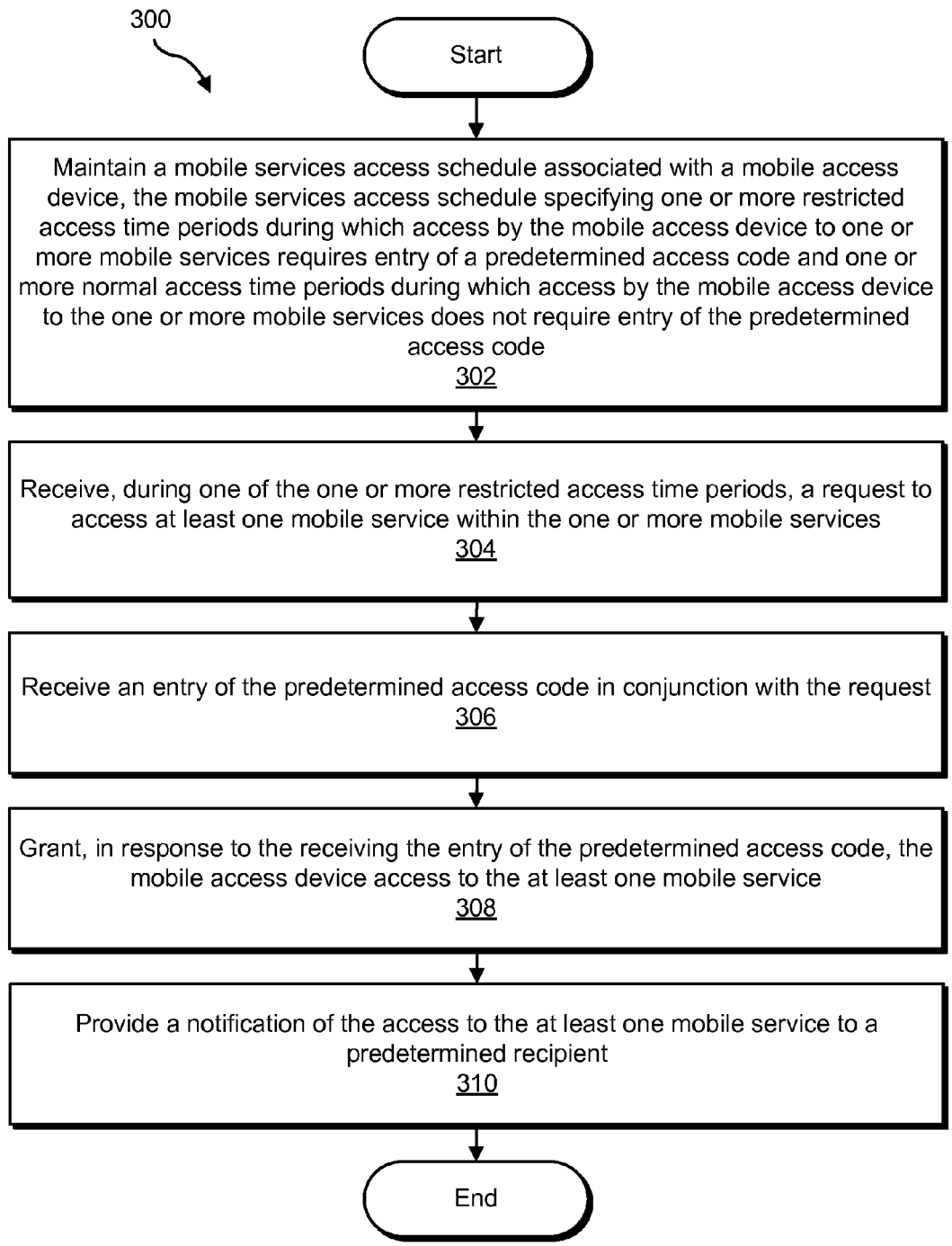
FIG. 3 illustrates an exemplary mobile services access management method according to principles described herein.

FIG. 3 illustrates an exemplary mobile services access management method 300. While FIG. 3 illustrates exemplary steps according to one embodiment, other embodiments may omit, add to, reorder, and/or modify any of the steps shown in FIG. 3. One or more of the steps shown in FIG. 3 may be performed by any component or combination of components of system 100.

In step 302, a mobile services access management system maintains a mobile services access schedule associated with a mobile access device. For example, scheduling facility 102 may be configured to maintain a mobile services access schedule associated with mobile access device 204-1. The mobile services access schedule may specify one or more restricted access time periods and one or more normal access time periods. Access by mobile access device 204-1 to one or more mobile services provided by provider subsystem 202 during the one or more restricted access time periods may require entry of a predetermined access code while entry of the predetermined access code may be unnecessary during the one or more normal access time periods. Scheduling facility 102 may be configured to maintain the mobile services access schedule in any suitable manner.

Figure 4:
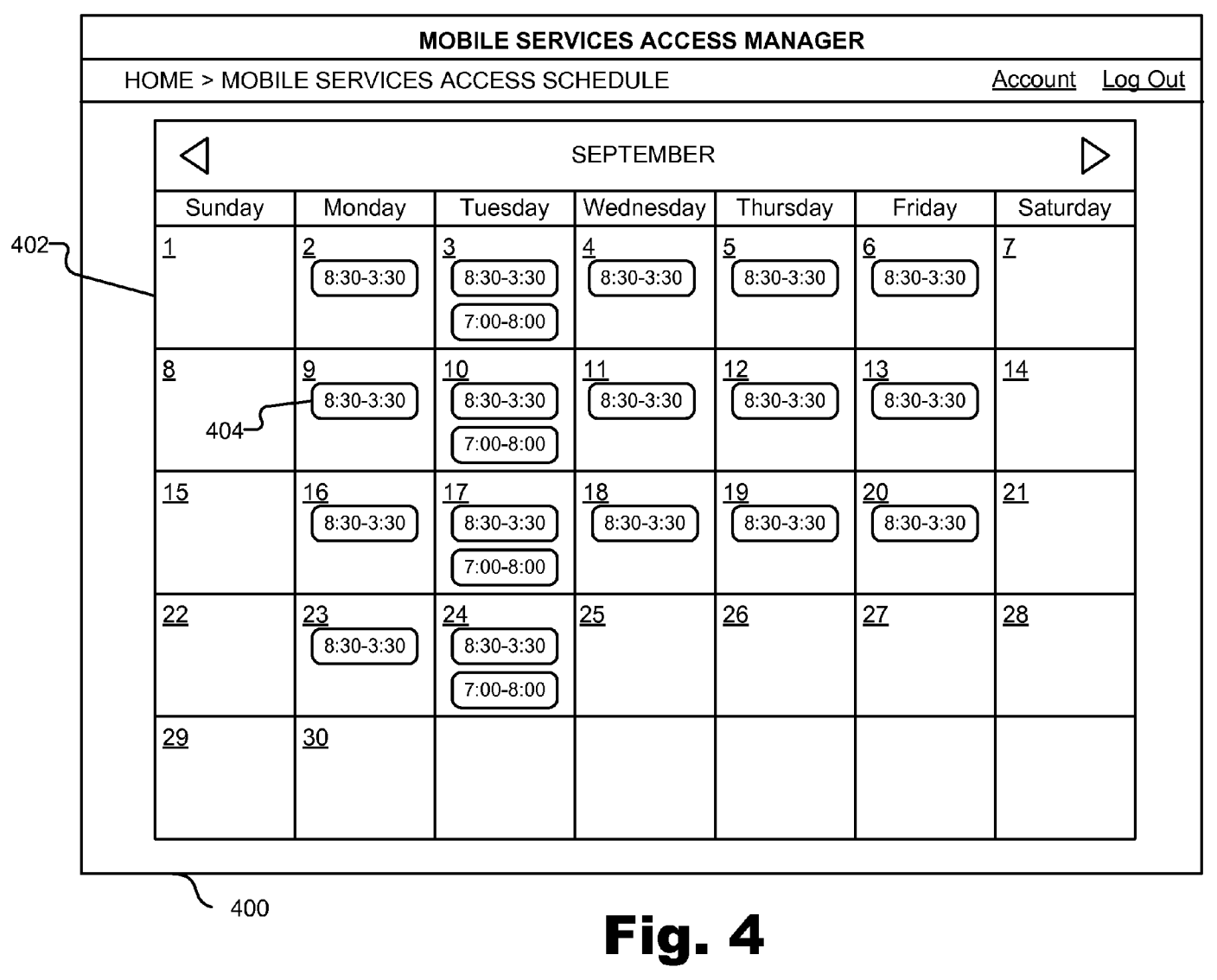

FIG. 4 illustrates an exemplary graphical user interface ("GUI") 400 including a display of an exemplary mobile services access schedule 402 that may be generated and/or displayed by scheduling facility 102. As shown in FIG. 4, mobile services access schedule 402 may include a plurality of restricted access time periods such as restricted access time period 404. In some examples, any time period not designated as a restricted access time period 404 in GUI 400 may represent a normal access time period. Each restricted access time period may be defined using any combination of minutes, hours, days, weeks, and/or months. Each restricted access time period may include a start time and end time (e.g., or alternatively a start time and a duration). For example, restricted access time period 404 has a start time of 8:30 AM and an end time of 3:30 PM. In additional or alternative examples, a particular day within mobile services access schedule 402 may include no restricted access time periods, a single restricted access time period, or a plurality of restricted access time periods.

GUI 400 may be configured to allow a user (e.g., a primary account holder) to manage mobile services access schedule 402. For example, GUI 400 may be configured to allow a user to add, delete, and/or modify restricted access time periods. To illustrate, GUI 400 may be configured to allow a user to select a particular restricted access time period to delete or modify the particular restricted access time period, select a particular day to add a restricted access time period to the particular day, and/or perform any other suitable operation to manage mobile services access schedule 402.

Figure 5:
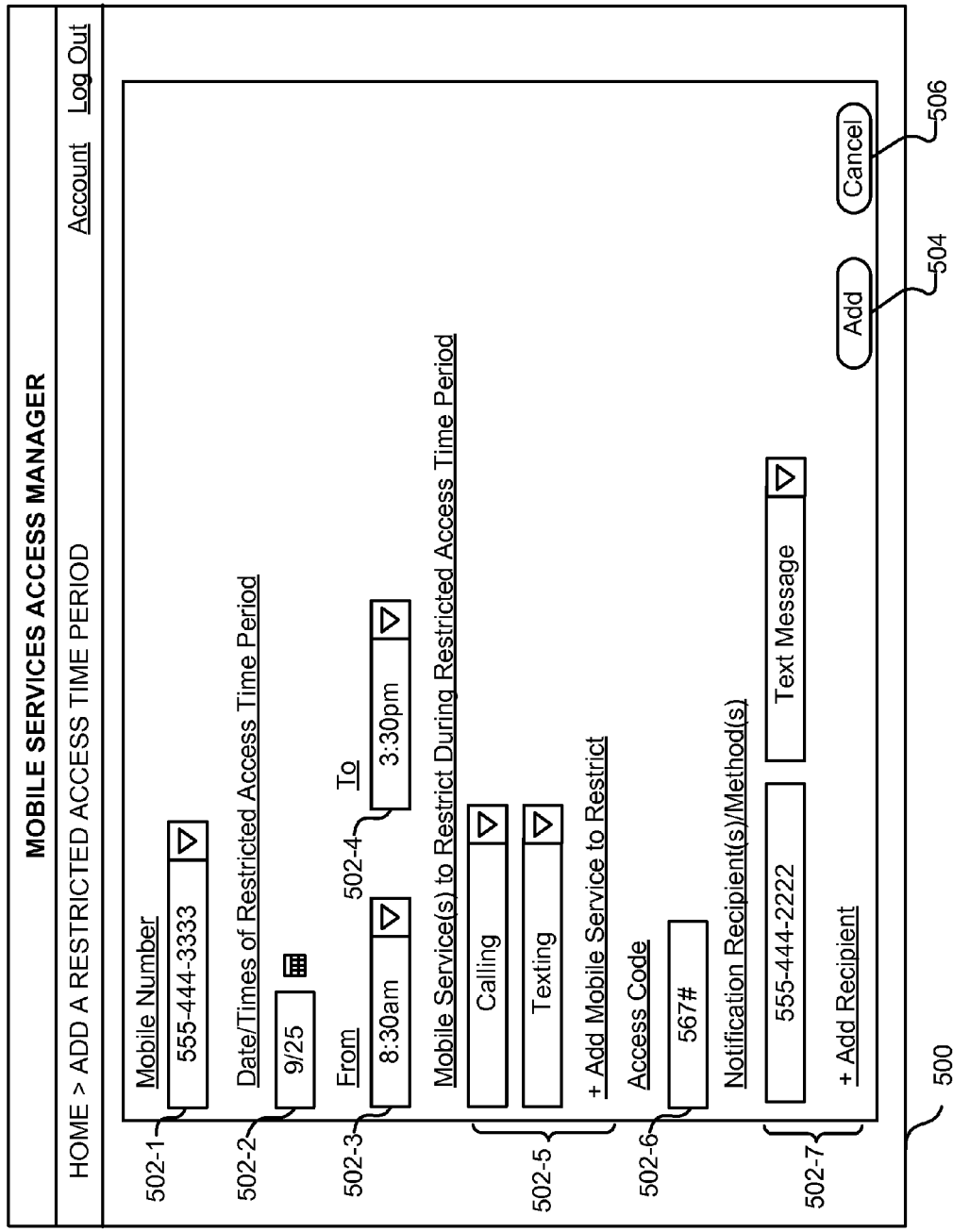
FIG. 5 illustrates an exemplary GUI configured to facilitate the addition of a restricted access time period to the mobile services access schedule of FIG. 4 according to principles described herein.

As mentioned above, scheduling facility 102 may be configured to receive configuration parameters defining one or more aspects of a mobile services access schedule. For example, FIG. 5 shows another exemplary GUI 500 through which scheduling facility 102 may receive one or more configuration parameters associated with a restricted access time period to be added to mobile services access schedule 402. In some examples, GUI 500 may be displayed in response to a selection by a user of a corresponding day within mobile services access schedule 402.

As shown, GUI 500 may include a plurality of form-fillable and/or selectable configuration parameters 502-1 through 502-7 (referred to collectively herein as "configuration parameters 502"). In some examples, a user may utilize configuration parameters 502 to define one or more aspects of a restricted access time period to be added to mobile services access schedule 402. For example, as shown in FIG. 5, a user may utilize configuration parameters 502 to specify the mobile access device (e.g., the mobile telephone number associated with the mobile access device) to be governed by the restricted access time period, a date and/or times of the restricted access time period, one or more mobile services to be restricted during the restricted access time period (e.g., telephone calling service, text messaging service, etc.), the predetermined access code required to gain access to the restricted mobile services during the restricted access time period, the predetermined recipients (e.g., the mobile phone numbers or email addresses associated with the predetermined recipients) to be notified of access granted during the restricted access time period, a method of providing the notification (e.g., by text message, email, etc.), and/or any other suitable aspect of the restricted access time period. Additionally or alternatively, GUI 500 may include selectable options 504 and 506 configured to allow a user to "add" or "cancel" the restricted access time period.

GUI 500 is provided for illustration only and is not limiting. In additional or alternative embodiments, GUI 500 may be modified to include additional configuration parameters and/or exclude certain illustrated configuration parameters as may serve a particular implementation.

In some examples, mobile services access schedule 402 may be linked to a separate calendar and/or calendaring system. For example, FIG. 6 illustrates an exemplary GUI 600 configured to allow a user to link mobile services access schedule 402 to an electronic calendar. As shown, GUI 600 includes a plurality of selectable and/or form-fillable configuration parameters 602-1 through 602-6 (collectively referred to herein as "configuration parameters 602"). A user may utilize configuration parameters 602 to select a calendar (e.g., a calendar including a child's school schedule), exclude one or more time periods from restricted access time periods obtained from the selected calendar (e.g., for a daily lunch hour), exclude state and/or federal holidays from restricted access time periods obtained from the selected calendar, input a predetermined access code required to gain access to one or restricted mobile services during restricted access time periods obtained from the selected calendar, identify one or more predetermined recipients (e.g., a mobile access device of a parent and/or an email address of a school official) to notify of access granted during restricted access time periods obtained from the selected calendar, identify one or more methods of providing the notifications, and/or any other suitable operation associated with the selected calendar. Additionally or alternatively, GUI 600 may include selectable options 604 and 606 configured to allow a user to "Add" or "Cancel" a link to the selected calendar. Once a link to a selected calendar is established, scheduling facility 102 may be configured to add one or more restricted access time periods to mobile services access schedule 402 based on information received from the selected calendar.

Returning to FIG. 3, in step 304, the mobile services access management system receives, during one of the one or more restricted access time periods, a request to access at least one mobile service within the one or more mobile services. For example, access management facility 104 may be configured to receive a request from mobile access device 204-1 to access the at least one mobile service during a restricted time period. Access management facility 104 may be configured to receive the request from mobile access device 204-1 in any suitable manner, such as described herein.

In step 306, the mobile services access management system receives an entry of the predetermined access code in conjunction with the request. For example, access management facility 104 may be configured to receive the entry of the predetermined access code in conjunction with the request received from mobile access device 204-1. The predetermined access code may be entered by a user using mobile access device 204-1 and/or received by access management facility 104 in any suitable manner, such as described herein.

In step 308, the mobile services access management system grants, in response to receiving the entry of the predetermined access code, the mobile access device access to the at least one mobile service. For example, in response to receiving the entry of the predetermined access code, access management facility 104 may be configured to grant mobile access device 204-1 access to the at least one mobile service. Access management facility 104 may be configured to grant mobile access device 204-1 access to the at least one mobile service in any suitable manner and subject to any suitable limitation, such as described herein.

In step 310, the mobile services access management system provides a notification of the access to the at least one mobile service to a predetermined recipient. For example, notification facility 106 may be configured to provide a notification to mobile access device 204-2 in response to the access by mobile access device 204-1 to the at least one mobile service. The notification may be provided by notification facility 106 in any suitable manner and may include any suitable information, such as described herein.

To illustrate, FIG. 7 shows an exemplary notification 700 that may be provided by notification facility 106 to mobile access device 204-2. Notification facility 106 may be configured to provide notification 700 to mobile access device 204-2 in any suitable manner (e.g., in a text message or email). As shown, notification 700 may be configured to inform a user of mobile access device 204-2 that "The mobile phone associated with mobile phone number 555-444-3333 sent a text message to 555-444-5555 on September 25 at 11:00 am containing the following message: I am having so much fun in Spanish class! Do you want to study tonight?" In additional or alternative examples, notification 700 may be provided to mobile access device 204-2 and/or another computing device associated with a predetermined recipient in any other suitable manner and may include any other suitable information.

Figure 8:
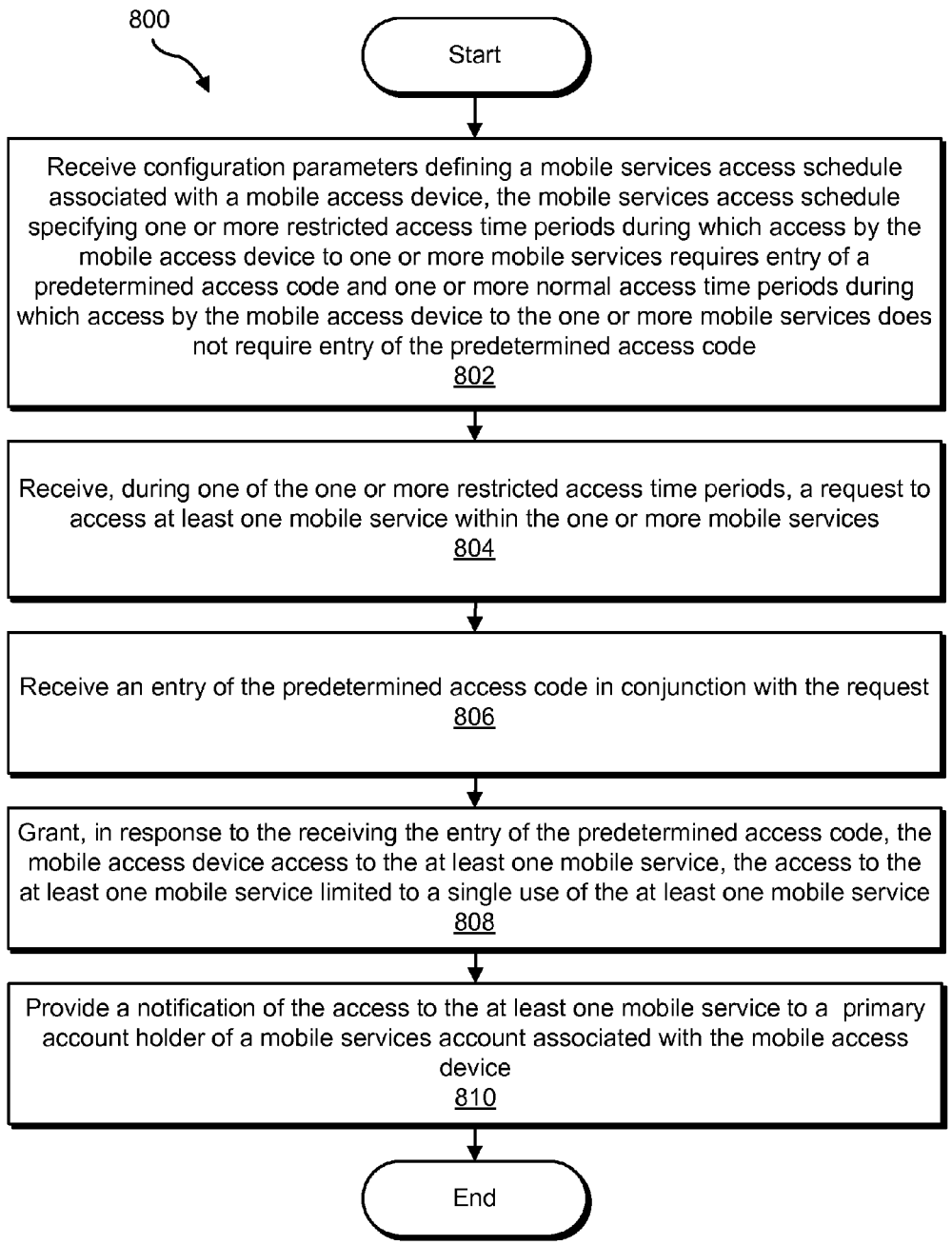
FIG. 8 illustrates another exemplary mobile services access management method according to principles described herein.

FIG. 8 illustrates another exemplary mobile services access management method 800. While FIG. 8 illustrates exemplary steps according to one embodiment, other embodiments may omit, add to, reorder, and/or modify any of the steps shown in FIG. 8. The steps shown in FIG. 8 may be performed by any component or combination of components of system 100.

In step 802, a mobile services access management system receives configuration parameters defining a mobile services access schedule associated with a mobile access device. The mobile services access schedule may specify one or more restricted access time periods during which access by the mobile access device to one or more mobile services requires entry of a predetermined access code and one or more normal access time periods during which access by the mobile access device to the one or more mobile services does not require entry of the predetermined access code. In some examples, the configuration parameters may be provided by a primary account holder of a mobile services account associated with the mobile access device. The configuration parameters may be received in any suitable manner such as described herein.

In step 804, mobile services access management system receives, during one of the one or more restricted access time periods, a request to access at least one mobile service within the one or more mobile services. The request may be received in any suitable manner such as described herein.

In step 806, mobile services access management system receives an entry of the predetermined access code in conjunction with the request. The entry of the predetermined access code may be received in any suitable manner such as described herein.

In step 808, the mobile services access management system grants, in response to the receiving the entry of the predetermined access code, the mobile access device access to the at least one mobile service. In some examples, the access to the at least one mobile service may be limited to a single use. The access to the at least one mobile service may be granted in any suitable manner such as described herein.

In step 810, the mobile services access management system provides a notification of the access to the at least one mobile service to a primary account holder of a mobile services account associated with the mobile access device. The notification may include any suitable information and/or may be provided in any suitable manner such as described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 9:
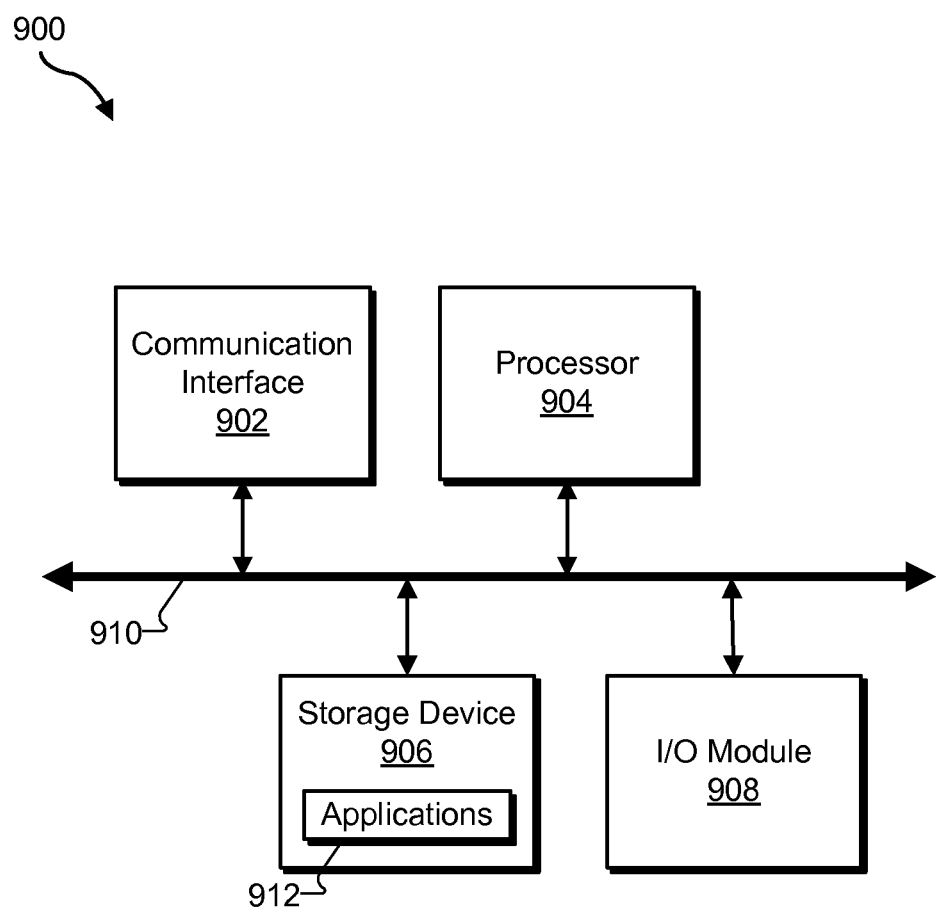
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, and any other suitable interface. In at least one embodiment, communication interface 902 may provide a direct connection between system 100 and one or more provisioning systems via a direct link to a network, such as the Internet. Communication interface 902 may additionally or alternatively provide such a connection through, for example, a local area network (such as an Ethernet network), a personal area network, a telephone or cable network, a satellite data connection, a dedicated URL, or any other suitable connection. Communication interface 902 may be configured to interface with any suitable communication media, protocols, and formats, including any of those mentioned above.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 906. For example, data representative of one or more executable applications 912 (which may include, but are not limited to, one or more of the software applications described herein) configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with scheduling facility 102, access management facility 104, and/or notification facility 106. Likewise, storage facility 108 may be implemented by or within storage device 906.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   maintaining, by a mobile services access management system, a mobile services access schedule associated with a mobile access device, the mobile services access schedule specifying one or more restricted access time periods during which access by the mobile access device to one or more mobile services requires entry of a predetermined access code and one or more normal access time periods during which access by the mobile access device to the one or more mobile services does not require entry of the predetermined access code,
   automatically defining, by the mobile services access management system, at least one of the one or more restricted access time periods to coincide with one or more events specified by a calendar maintained by a calendaring system linked to the mobile services access management system;
   receiving, by the mobile services access management system during one of the one or more restricted access time periods, a request to access at least one mobile service within the one or more mobile services;
   receiving, by the mobile services access management system, an entry of the predetermined access code in conjunction with the request;
   granting, by the mobile services access management system in response to the receiving the entry of the predetermined access code, the mobile access device access to the at least one mobile service; and
   providing, by the mobile services access management system, a notification of the access to the at least one mobile service to a predetermined recipient.

2. The method of claim 1, further comprising receiving, by the mobile services access management system, configuration parameters defining one or more aspects of the mobile services access schedule.

3. The method of claim 2, wherein the configuration parameters are provided by a primary account holder of a mobile services account associated with the mobile access device.

4. The method of claim 2, wherein the configuration parameters define at least one of the one or more mobile services to be restricted during the one or more restricted access time periods, dates and times of the one or more restricted access time periods, dates and times of one or more normal access time periods, the predetermined recipient, a manner of providing the notification to the predetermined recipient, and the predetermined access code.

5. The method of claim 2, wherein at least one of the configuration parameters is received by way of a graphical user interface.

6. The method of claim 2, wherein at least one of the configuration parameters is received by way of another mobile access device.

7. The method of claim 1, wherein the calendaring system is associated with a third party.

8. The method of claim 1, further comprising dynamically updating, by the mobile services access management system, the mobile services access schedule to coincide with the calendar.

9. The method of claim 1, wherein the one or more mobile services comprise at least one of a mobile telephone service, a mobile text message service, a mobile email service, a video call service, and a mobile data service.

10. The method of claim 1, wherein the providing the notification is triggered by the predetermined access code.

11. The method of claim 1, wherein the notification includes information identifying at least one of the at least one mobile service, a time of the access to the at least one mobile service, a duration of the access to the at least one mobile service, a content of a communication sent or received during the access to the at least one mobile service, a sender or recipient of the communication sent or received during the access to the at least one mobile service, and a physical location of the mobile access device at the time of the access to the at least one mobile service.

12. The method of claim 1, wherein the predetermined recipient is a primary account holder of a mobile services account associated with the mobile access device.

13. The method of claim 1, wherein the providing the notification comprises sending a text message to the predetermined recipient notifying the predetermined recipient of the access to the at least one mobile service.

14. The method of claim 1, wherein at least another one of the one or more restricted access time periods corresponds to at least one of a school schedule, a study schedule, a sleep schedule, and a work schedule associated with a user of the mobile access device.

15. The method of claim 1, wherein the access by the mobile access device to the one or more mobile services during the one or more restricted access time periods further requires that the mobile access device be physically located within a predetermined geographic area.

16. The method of claim 1, further comprising:
   receiving, by the mobile services access management system, an override command to override a particular restricted access time period within the one or more restricted access time periods; and
   overriding, by the mobile services access management system in response to receiving the override command, the requirement to enter the predetermined access code during the particular restricted access time period such that the mobile access device is granted unrestricted access to the one or more mobile services during the particular restricted access time period.

17. The method of claim 16, wherein the receiving of the override command comprises receiving a communication including a predetermined override code, the communication comprising at least one of a text message and an email.

18. The method of claim 17, further comprising concealing, by the mobile services access system, the override code from a user of the mobile access device.

19. The method of claim 1, wherein the access to the at least one mobile service is limited to a single use of the at least one mobile service.

20. The method of claim 19, wherein the single use of the at least one mobile service comprises sending or receiving a telephone call, an email, or a text message.

21. The method of claim 1, embodied as computer-executable instructions on at least one non-transitory computer-readable medium.

22. A method comprising:
receiving, by a mobile services access management system, configuration parameters defining a mobile services access schedule associated with a mobile access device, the mobile services access schedule specifying one or more restricted access time periods during which access by the mobile access device to one or more mobile services requires entry of a predetermined access code and one or more normal access time periods during which access by the mobile access device to the one or more mobile services does not require entry of the predetermined access code, the configuration parameters provided by a primary account holder of a mobile services account associated with the mobile access device,
automatically defining, by the mobile services access management system, at least one of the one or more restricted access time periods in the mobile services access schedule defined by the configuration parameters to coincide with one or more events specified by a calendar maintained by a calendaring system linked to the mobile services access management system;
receiving, by the mobile services access management system during one of the one or more restricted access time periods, a request to access at least one mobile service within the one or more mobile services;
receiving, by the mobile services access management system, an entry of the predetermined access code in conjunction with the request;
granting, by the mobile services access management system in response to the receiving the entry of the predetermined access code, the mobile access device access to the at least one mobile service, the access to the at least one mobile service limited to a single use of the at least one mobile service; and
providing, by the mobile services access management system, a notification of the access to the primary account holder.

23. The method of claim 22, wherein at least one of the configuration parameters is received by way of a graphical user interface.

24. A system comprising:
at least one computing device implementing:
a scheduling facility configured to maintain a mobile services access schedule associated with a mobile access device, the mobile services access schedule specifying one or more restricted access time periods during which access by the mobile access device to one or more mobile services requires entry of a predetermined access code and one or more normal access time periods during which access by the mobile access device to the one or more mobile services does not require entry of the predetermined access code,
  wherein the scheduling facility automatically defines at least one of the one or more restricted access time periods to coincide with one or more events specified by a calendar maintained by a calendaring system linked to the mobile services access management system;
an access management facility communicatively coupled to the scheduling facility and configured to
  receive, during one of the one or more restricted access time periods, a request to access at least one mobile service within the one or more mobile services,
  receive an entry of the predetermined access code in conjunction with the request, and
  grant, in response to receiving the entry of the predetermined access code, the mobile access device access to the at least one mobile service; and
a notification facility communicatively coupled to the access management facility and configured to provide a notification of the access to the at least one mobile service to a predetermined recipient.

* * * * *